No. 688,570. Patented Dec. 10, 1901.
A. R. ANTHONY & R. IRELAND.
SPROCKET WHEEL.
(Application filed Jan. 16, 1901.)
(No Model.)
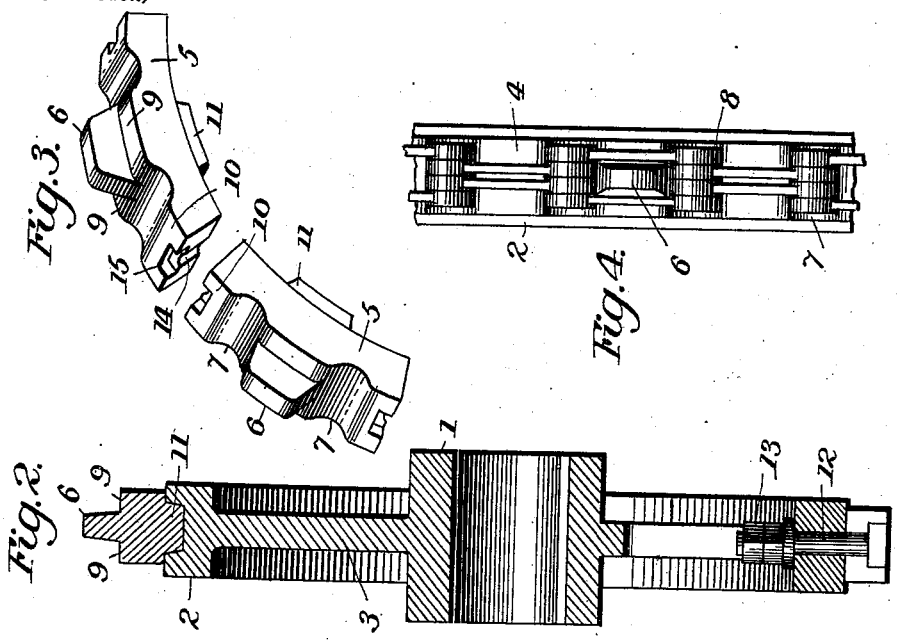
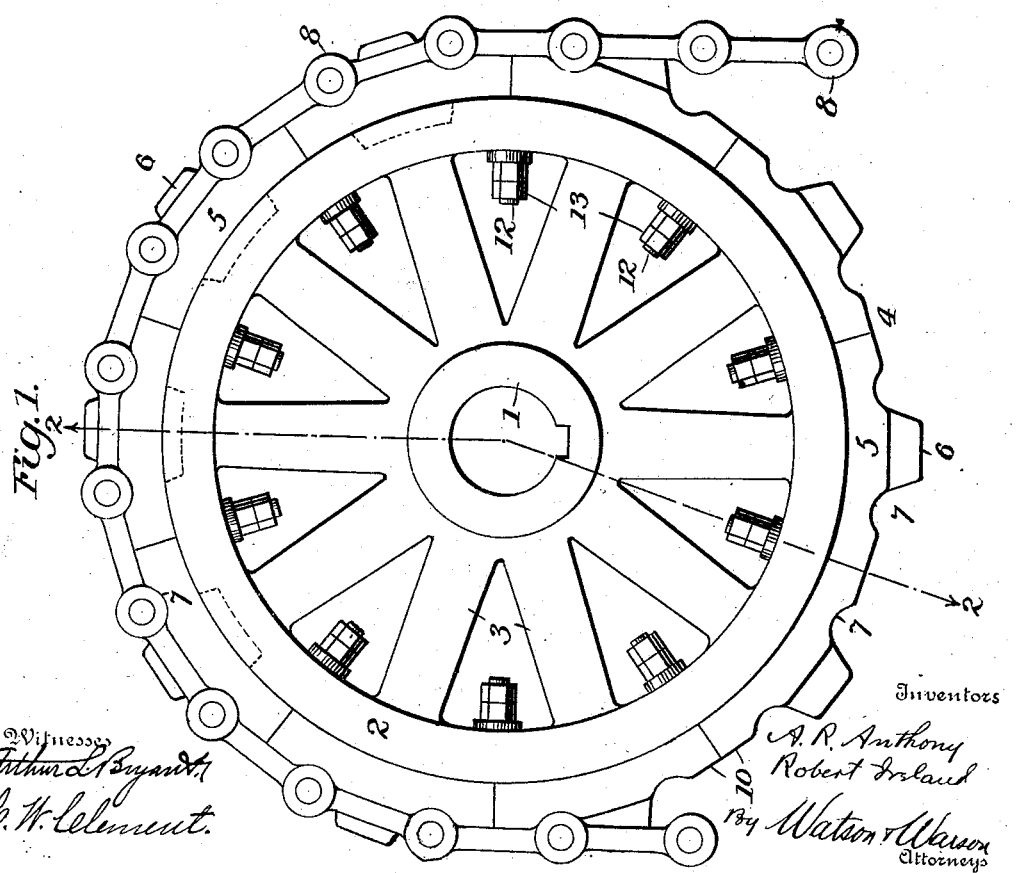

UNITED STATES PATENT OFFICE.

ALFRED R. ANTHONY AND ROBERT IRELAND, OF WILKESBARRE, PENNSYLVANIA.

SPROCKET-WHEEL.

SPECIFICATION forming part of Letters Patent No. 688,570, dated December 10, 1901.

Application filed January 16, 1901. Serial No. 43,534. (No model.)

*To all whom it may concern:*

Be it known that we, ALFRED R. ANTHONY and ROBERT IRELAND, citizens of the United States, residing at Wilkesbarre, in the county of Luzerne, State of Pennsylvania, have invented certain new and useful Improvements in Sprocket-Wheels, of which the following is a specification.

The purpose of our invention is to provide a sprocket-wheel especially adapted for use in conveyer and elevator systems in which all of the parts subject to wear are removable in short sections and may be replaced by parts of standard size, so as to make the pitch of the wheel correspond with that of the chain, and said removable parts are so formed as to more evenly distribute the strain and wear between the wheel and chain than in the ordinary sprocket-wheel.

By means of our improvements a wheel may be continued in use indefinitely and always in good working condition.

In the accompanying drawings, which illustrate our invention, Figure 1 is a side view of a complete wheel made in accordance with our invention and showing a portion of the chain in position upon the wheel. Fig. 2 is a section on the line 2 2 of Fig. 1. Fig. 3 is a perspective view of adjoining sections of the sprocket-rim, and Fig. 4 is a plan view of a portion of the wheel with the chain-links upon it.

Referring to the drawings, 1 indicates the hub of the wheel, and 2 a hub-rim, which is secured to the hub by spokes 3, all of said parts, as shown, being cast integral and forming the hub portion of the wheel. Upon the perimeter of the hub-rim is superposed a sprocket-rim 4, composed of a circular series of removable sections 5, each section, as shown, having a centrally-located sprocket-tooth 6 of less width than the section and transverse depressions 7 in the front and rear of each tooth extending laterally beyond the tooth and adapted to receive the heads 8 of the central and side links of the chain. The parts 9 of the rim-sections on either side of the teeth and between the depressions form supports for the links and shoulders against which the heads of the links within the transverse depressions bear when power is applied to the wheel or to the chain. The intermediate raised portions 10 between the teeth also support the chain-links. The rim-sections are each formed with projections 11 upon their under sides adapted to fit into corresponding sockets formed in the face of the hub-rim, as shown in Fig. 2. The ends of the adjacent sections abut against each other, and said sections are secured rigidly to the hub-rim by means of bolts 12, passing through bolt-holes formed between the adjoining sections and into the spaces between the spokes, said bolts being secured by nuts 13. As shown, each end of each section is formed with a groove 14 and a half-socket 15, which when the sections are in place form openings for the shanks of the bolts and sockets adapted to receive the heads of the bolts. With this construction it will be noted that the heads of the inner links bear against the sprocket-teeth, as in the ordinary wheel, and the heads of the outer links bear against the shoulders on either side of the teeth, thus distributing the wear over a greater area than is usual and correspondingly increasing the life of the parts.

In practice, owing mainly to inequalities in the metal, it is found that some teeth wear out much more rapidly than others, and wheels have therefore been constructed in which the teeth were removable and might be replaced from time to time. Such wheels, however, have not generally been satisfactory. With the heavy links employed in conveyer-chains and the grit and dirt carried around by them, as well as by the strain upon the chain when a tooth becomes worn, the rim adjacent to the tooth also wears, and when a new tooth is supplied the chain does not fit the rim, and the result is as bad as before. We have also found that some portions of the rim will wear faster than others, owing to inequalities in the metal, and that whether the teeth or the rim, or both, be worn the chain no longer fits properly and the wear is increased at such points for that reason. To remedy these difficulties, we have constructed a wheel with a removable rim made in short sections, as described, each section having a tooth thereon, so that when any portion of the rim or any tooth, or both, become worn a new tooth and the adjacent rim-section of the correct size may be simultaneously supplied, and the pitch relations between the wheel and chain may thus be maintained. This is important, for the reason that if the pitch of the wheel and the chain-links do not correspond the latter will crowd and cause friction and increased wear.

It will be seen that the hub portion of the wheel may be used indefinitely and an entire new rim or parts thereof supplied as required. The teeth and rim-sections being comparatively small forgings or castings may be made nearly uniform as regards wearing qualities, and owing to the distribution of the strains throughout the heads of all four links the wearing parts will last for a considerable length of time without requiring renewal. As the chain-links are supported in the central portions between the heads, the wear of the rims beneath the heads is reduced to a minimum.

Having described our invention, what we claim, and desire to secure by Letters Patent of the United States, is—

1. In a sprocket-wheel a hub portion in combination with a sectional sprocket-rim and means for attaching the sprocket-rim removably to said hub portion, said sprocket-rim comprising a series of rim-sections of sufficient width to support the side links of the chain, and adapted to support said links, and having teeth of less width than said sections, and shoulders adjacent to the teeth adapted to be engaged by the heads of the chain-links, for the purpose set forth.

2. In a sprocket-wheel a hub portion in combination with a sectional sprocket-rim and means for attaching the sprocket-rim removably to said hub portion, said sprocket-rim comprising a series of rim-sections of sufficient width to support the side links of the chain, and adapted to support said links, and having teeth of less width than said sections and transverse depressions extending laterally beyond the teeth constructed to receive the heads of the central and side chain-links, for the purpose set forth.

3. In a sprocket-wheel a hub portion having an integral rim, in combination with a sectional sprocket-rim and means for attaching the sectional sprocket-rim removably to the integral rim, said sprocket-rim comprising a series of rim-sections of sufficient width to support the side links of the chain, and adapted to support said links, and having teeth of less width than said sections and transverse depressions extending laterally beyond the teeth and constructed to receive the heads of the central and side chain-links, for the purpose set forth.

4. In a sprocket-wheel, the combination with a hub portion having sockets in its periphery, of a sprocket-rim consisting of a series of abutting sections, each section having a tooth upon one side, a projection upon the opposite side adapted to fit into a socket in the hub-rim, and a groove 14 at each end, and means for securing said sections to the hub-rim consisting of bolts extending through the grooves between the sprocket-rim sections and into suitable openings in the hub-rim.

5. In a sprocket-wheel a removable sectional sprocket-rim, each section of said rim having a tooth 6, a projection 11, and a groove 14 at each end thereof, substantially as described.

In testimony whereof we affix our signatures in presence of two witnesses.

ALFRED R. ANTHONY.
ROBERT IRELAND.

Witnesses:
J. B. DAVENPORT,
F. B. DAVENPORT.